US009762104B2

United States Patent
Li et al.

(10) Patent No.: US 9,762,104 B2
(45) Date of Patent: Sep. 12, 2017

(54) DRIVE APPARATUS

(71) Applicant: Johnson Electric S.A., Murten (CH)

(72) Inventors: Yue Li, Hong Kong (CN); Jie Chai, Shenzhen (CN); Jing Ning Ta, Hong Kong (CN); Hong Yu Ding, Shenzhen (CN); Tao Zhang, Shenzhen (CN); Chui You Zhou, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 303 days.

(21) Appl. No.: 14/755,431

(22) Filed: Jun. 30, 2015

(65) Prior Publication Data

US 2015/0375824 A1    Dec. 31, 2015

(30) Foreign Application Priority Data

Jun. 30, 2014   (CN) .......................... 2014 1 0306671

(51) Int. Cl.
| | |
|---|---|
| *H02K 7/116* | (2006.01) |
| *B62M 6/65* | (2010.01) |
| *H02K 7/14* | (2006.01) |
| *B62M 6/60* | (2010.01) |
| *H02K 16/00* | (2006.01) |

(52) U.S. Cl.
CPC .............. *H02K 7/116* (2013.01); *B62M 6/60* (2013.01); *B62M 6/65* (2013.01); *H02K 7/14* (2013.01); *H02K 16/00* (2013.01); *Y02T 10/641* (2013.01)

(58) Field of Classification Search
CPC .......... H02K 7/116; H02K 7/14; H02K 16/00; B62M 6/60; B62M 6/65; Y02T 10/641
See application file for complete search history.

(56) References Cited

U.S. PATENT DOCUMENTS

| | | | | |
|---|---|---|---|---|
| 1,558,806 | A | * 10/1925 | Hess, Jr. ................ | B60K 6/365 290/10 |
| 5,713,813 | A | * 2/1998 | von Greyerz ............. | F16H 3/74 475/199 |
| 2013/0023371 | A1* | 1/2013 | Yun ....................... | F16H 57/082 475/149 |
| 2013/0040774 | A1* | 2/2013 | An ........................... | B62M 6/65 475/149 |
| 2014/0035347 | A1* | 2/2014 | Zanfei ...................... | B62M 6/50 301/6.5 |

FOREIGN PATENT DOCUMENTS

| | | |
|---|---|---|
| JP | 2009-291031 A | 12/2009 |
| KR | 10-2012-0133428 A | 12/2012 |

* cited by examiner

*Primary Examiner* — Mohamad Musleh
(74) *Attorney, Agent, or Firm* — Muncy, Geissler, Olds & Lowe, P.C.

(57) ABSTRACT

A drive apparatus for an electric bike includes a hollow housing body, an internal ring gear fixed to the housing body, and a main shaft. At least two motor units are mounted in the housing body. Each motor unit includes a support bracket and a number of motors mounted on the support bracket. Each motor drives the internal gear through a transmission mechanism to rotate the housing body about the main shaft. The motors share one controller. Peaks of the motor cogging torque can be staggered.

13 Claims, 7 Drawing Sheets

DRIVE APPARATUS

CROSS REFERENCE TO RELATED APPLICATIONS

This non-provisional patent application claims priority under 35 U.S.C. §119(a) from Patent Application No. 201410306671.0 filed in The People's Republic of China on Jun. 30, 2014, the entire contents of which are hereby incorporated by reference.

FIELD OF THE INVENTION

This invention relates to a drive apparatus for an electric bike having multiple electric motors.

BACKGROUND OF THE INVENTION

Electric bikes use electric power as a primary or auxiliary power system, with manual power being an alternate system in some cases. The electric power system has at least one electric motor, a controller, storage battery, an input device and a display. In recent years, as an environment-friendly and energy-saving transportation tool, electric bikes have grown in popularity. As a key component of the electric bikes, the power system's configuration and quality often determine the overall performance of the electric bikes.

Current power systems for the electric bikes usually use a large direct current brushless motor or transverse flux motor to provide the driving force. However, the traditional drive apparatus has a large size and weight and a low efficiency, which is against the trend of electric bikes toward light weight, high power and increased efficiency to extend the range per charge.

SUMMARY OF THE INVENTION

Thus, there is a desire for a drive apparatus for an electric bike, which has a light weight and high power density and is capable of stable operation.

Accordingly, in one aspect thereof, the present invention provides drive apparatus for an electric bike, comprising: a hollow housing body; a main shaft passing through the housing body; at least one internal ring gear fixed with the housing body; and at least two motor units are mounted in the housing body, wherein each motor unit comprises a support bracket fixed to the main shaft, and multiple motors mounted on a first side of the support bracket, each of the motors drives the ring gear through a transmission mechanism, which in turn rotates the housing body about the main shaft.

Preferably, the support bracket comprises multiple mounting portions, each mounting portion defines a shaft hole, the transmission mechanism comprises an idle gear and a drive gear, a motor shaft of each motor passes from the first side of the corresponding support bracket through the corresponding shaft hole and is connected to the drive gear on an opposite second side of the support bracket, the idle gear is disposed on the second side of the support bracket, the drive gear is meshed with the idle gear, and the idle gear is meshed with the ring gear.

Preferably, the at least two motor units comprise two motor units, each of the support brackets comprises three said mounting portions uniformly distributed, the two support brackets are spaced apart in an axial direction and the mounting portions of the two support brackets are alternately arranged in a circumferential direction, such that each motor of one support bracket is arranged between two corresponding adjacent motors of the other support bracket.

Preferably, the at least one ring gear comprises two ring gears and each ring gear is fixed in an annular groove formed in an inner surface of a circumferential wall of the housing body.

Preferably, each mounting portion defines a mounting hole and a support pin is fixedly mounted in the mounting holes so as to extend away from the support bracket on the second side thereof and the idle gear is rotatably mounted to the support pin in mesh with the ring gear and the drive gear.

Preferably, each motor comprises a stator and a rotor, and at least part of the motors have a different initial position between the stator and rotor.

Preferably, the initial position of the stator relative to the rotor of each motor is shifted in sequence by a 360/m/n-degree mechanical angle, where m is the least common multiple of the number of magnetic poles and the number of winding slots of the motor, and n is the number of motors.

Preferably, a cogging torque of the drive apparatus is less than 1 Nm.

Preferably, the motors of at least two motor units are connected in series and share one controller.

Preferably, the drive apparatus further comprises a circuit board, the controller is disposed on the circuit board, and the circuit board is fixed to the support bracket of one of the motor units.

Preferably, outer flanges at opposite ends of the housing body are formed with multiple protrusions, and end caps are fixed to the protrusions with fasteners.

Preferably, opposite ends of the housing body are enclosed by respective end caps, and a bearing is mounted in each of the end caps for rotatably connecting the housing body to the main shaft.

According to a second aspect, the present invention provides an electric bike, incorporating the drive apparatus described above.

In the drive apparatus for the electric bike as described above, multiple small motors simultaneously drive the internal gears via idle gears, which in turn rotates the housing body. This makes the entire operation system safer and more stable. By mounting multiple small motors in the gear system, the power density of the electric bike system can be increased. In addition, multiple small motors are connected in series and share one controller, which provides a safer and more reliable operation system with lower cost. In addition, peaks of the cogging torque of the motors can be staggered, which can reduce the cogging torque of the entire drive apparatus and hence reduce the zero-load resistance of the electric bike.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
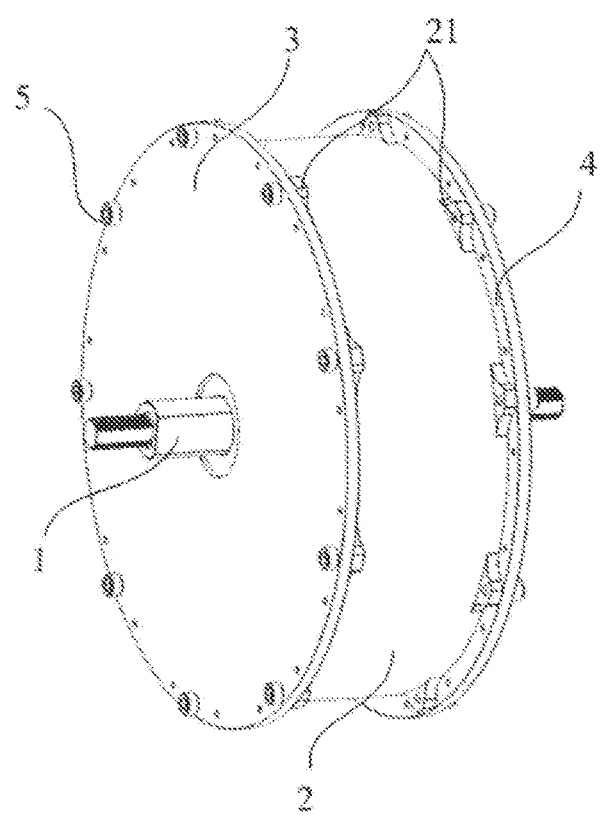
FIG. 1 is a perspective view of a drive apparatus for an electric bike according to a first embodiment of the present invention.

FIG. 1 illustrates a drive apparatus for an electric bike according to the preferred embodiment of the present invention. The drive apparatus includes a main shaft 1, and an outer housing rotatably mounted around the main shaft 1. The outer housing includes a cylindrical hollow housing body 2 and end caps 3, 4 enclosing opposite ends of the housing body 2. Outer flanges at the opposite ends of the housing body 2 are formed with multiple protrusions 21. The end caps 3, 4 are fixed to the protrusions 21 with fasteners 5. In one embodiment, the fasteners 5 are screws. In use the main shaft is fixed to a frame of the bike so that it can not turn. The housing body forms the hub of the rear wheel of the bike and thus rotates about the main shaft.

Figure 2:
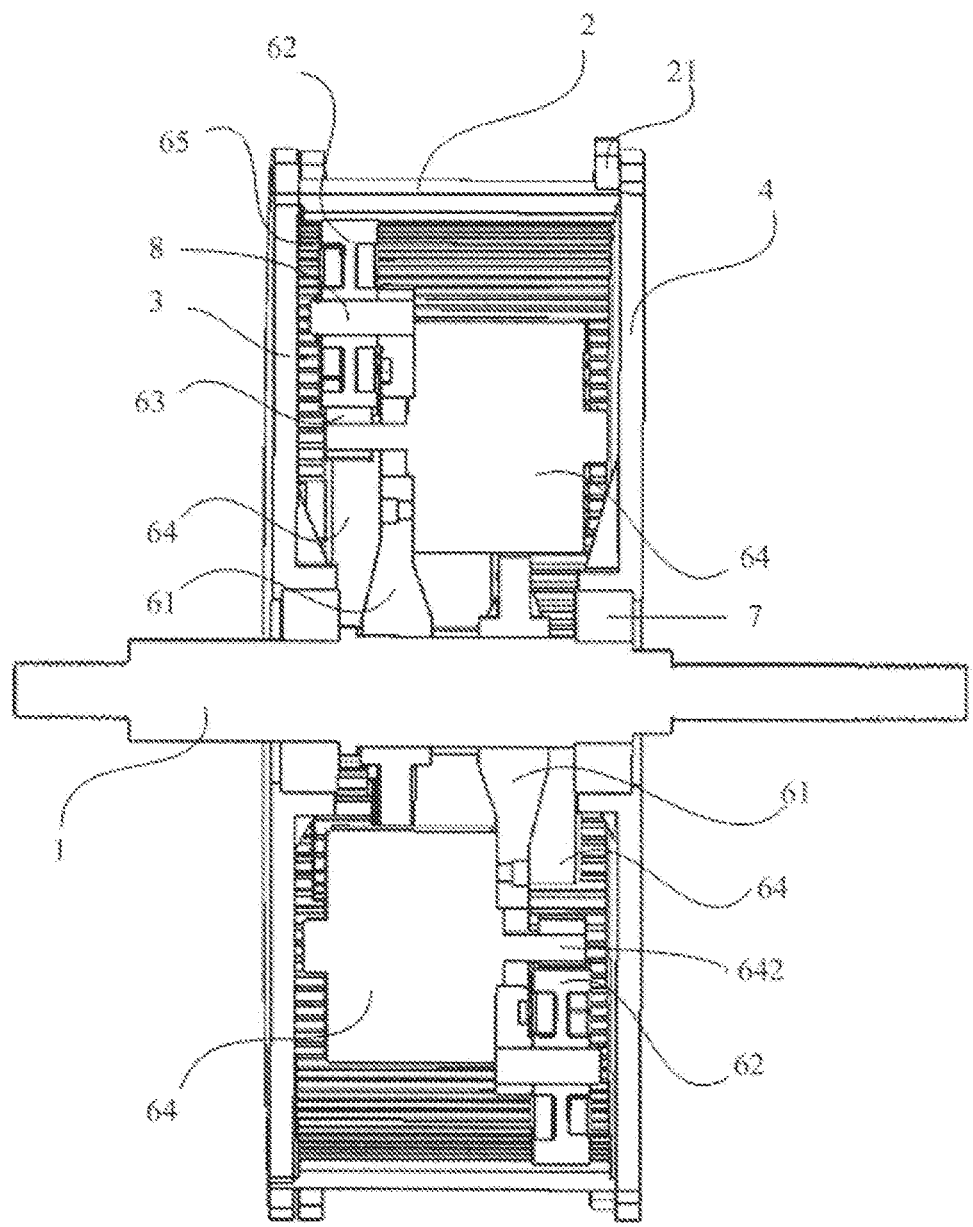
FIG. 2 is a sectional view of the drive apparatus of FIG. 1.
Figure 3:
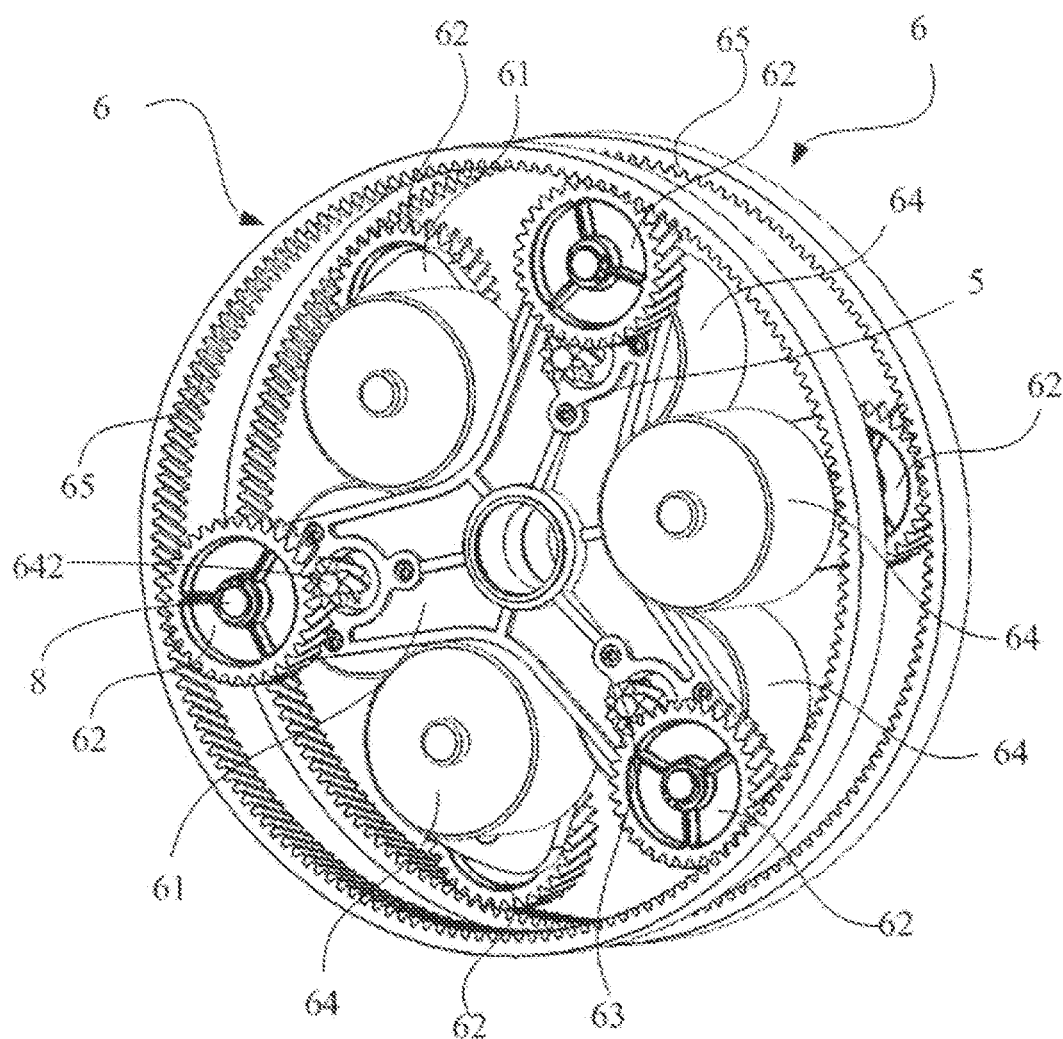
FIG. 3 illustrates two motor units of the drive apparatus.
Figure 4:
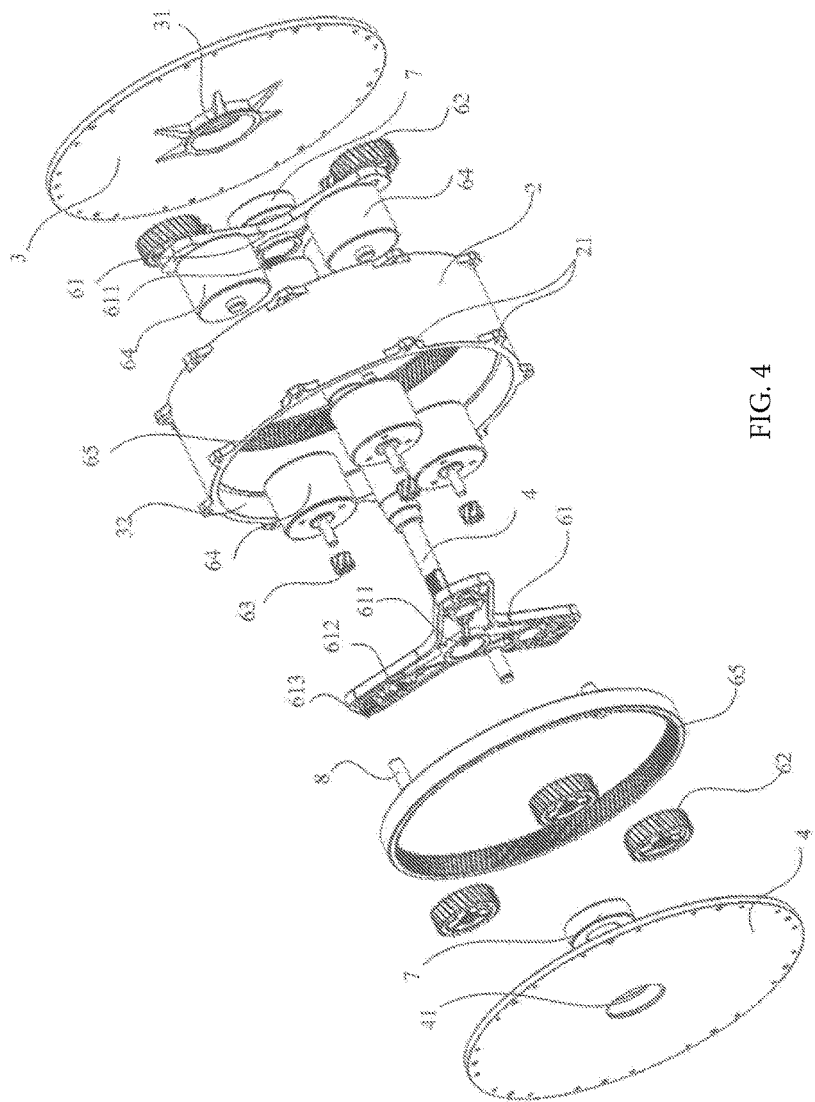
FIG. 4 is an exploded view of the drive apparatus of FIG. 1.

Referring to FIG. 2 to FIG. 4, the drive apparatus comprises a plurality of motors arranged in at least two groups of motor, referred to hereafter as motor units 6, disposed in the housing body 2. At least one internal ring gear 65 is fixed to or is formed with an inner surface of a circumferential wall of the housing body 2. Each motor unit 6 includes a support bracket 61 and multiple motors 64 mounted on the support bracket 61. Preferably, there is one ring gear per motor unit and the ring gear 65 is fixed to an inner surface of a wall of the housing body 2. Having separate ring gears 65, allows the ring gear to be made more efficiently and accurately. Each motor 64 is engaged with the internal gear 65 through a transmission mechanism. The main shaft 1 passes through the housing body 2. The support bracket 61 has a central axial hole 611 via which the support bracket 61 is fixedly mounted to the main shaft 1, such that the motors are fixed with respect to the main shaft. The motors rotate the ring gear 65 through the transmission mechanism, which in turn rotates the housing body 2 relative to the main shaft 1. As the ring gears are fixed to the housing body.

Referring to FIG. 3, two motor units 6 are utilized in the present embodiment. Each support bracket 61 includes three mounting portions uniformly distributed in a circumferential direction. The support brackets form a Y-shaped structure with a respective mounting portion at the end of each arm of the Y-shaped structure. The two support brackets 61 are spaced apart from each other in the axial direction and the motors of the two support brackets 61 are alternately arranged in the circumferential direction. That is, each motor 64 of one support bracket corresponds to a gap between two motors of the other support bracket 61. The central axial holes 611 of the two support brackets 61 are aligned with each other and fitted to the main shaft 4, preferably as a press fit, to position the motor units 6 within the housing body 2.

Specifically, as shown in FIGS. 3 and 4, each mounting portion of the support bracket 61 defines a hole 612. The transmission mechanism includes an idle gear 62 and a drive gear 63. A motor shaft 642 of each motor 64 passes from one side of the corresponding support bracket through the corresponding hole 612 and is connected to the drive gear 63 on an opposite side of the support bracket. Each motor 64 can be mounted to the mounting portion of the support bracket 61 through multiple fasteners 5. In addition, a mounting hole 613 (FIG. 4) is defined in each mounting portion. A support pin 8 is fixedly mounted in the mounting hole 613. The idle gear 62 is rotatably mounted around the support pin 8 in mesh with the ring gear. The drive gear 63 is meshed with the idle gear 62 to connect the motor shaft to the ring gear (FIG. 3).

Referring also to FIG. 2 and FIG. 4, each end cap 3, 4 defines a lengthened mounting hole 31, 41 (i.e. the axial length of the mounting holes 31, 41 is greater than the thickness of the end cap 3, 4). A bearing 7 is mounted in each mounting hole 31, 41 for supporting the housing body on the main shaft 4. Preferably, the bearing 7 is a ball bearing.

Figure 5:
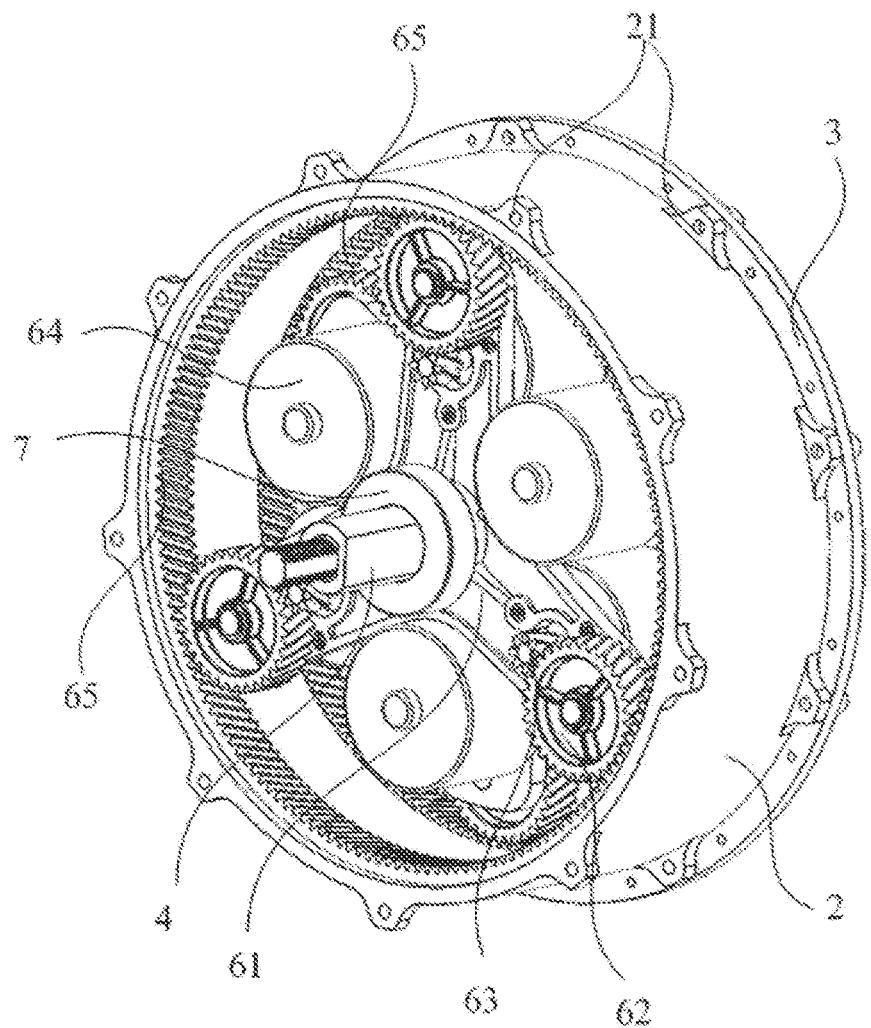
FIG. 5 illustrates the drive apparatus of FIG. 1, with one end cap removed to show the interior.

Referring to FIG. 4 and FIG. 5, in order to make the entire structure more stable when the entire motor units 6 are mounted in the housing body 2, opposite ends of the inner wall surface of the housing body 2 define a plurality of annular grooves 32. The ring gear 65 of each group of motor unit 6 is engagingly received in a corresponding one of the annular grooves 32. As such, by making the idle gears 62 mesh with the ring gear 65, the motor unit 6 can be stably mounted in the housing body 2. The six motors 64 synchronously operate to drive the transmission mechanism which in turns rotates the housing body 2.

Figure 6:
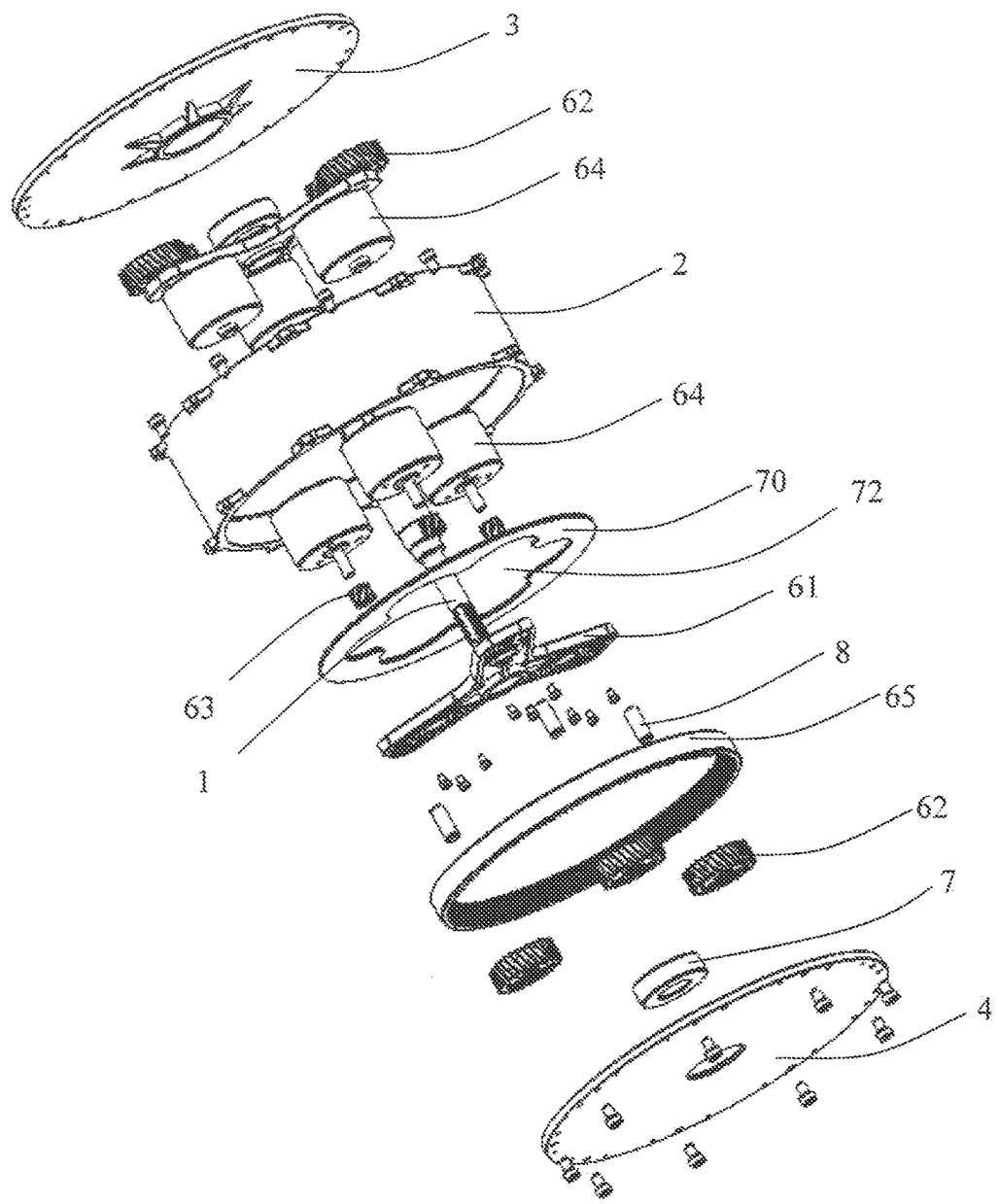
FIG. 6 is an exploded view of a drive apparatus according to a second embodiment.
Figure 7:
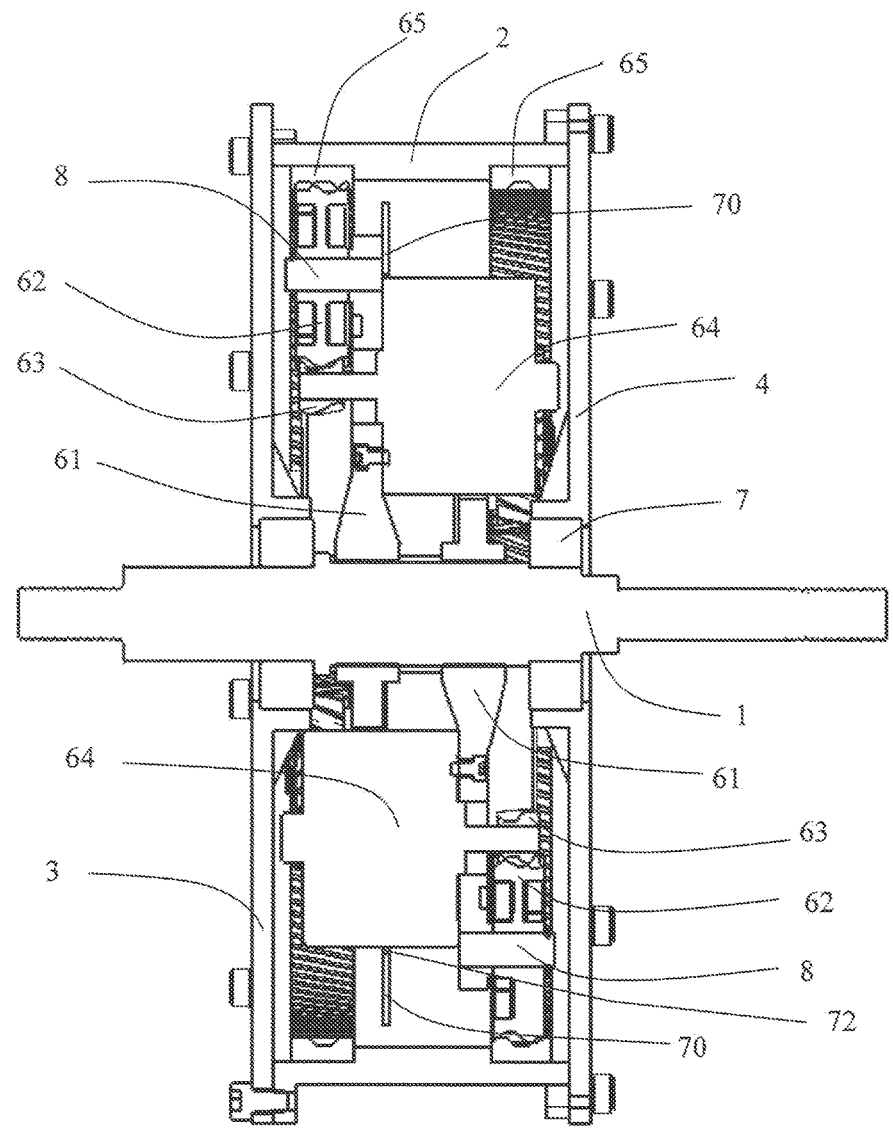
FIG. 7 is a sectional view of the drive apparatus of FIG. 6.
Figure 8:
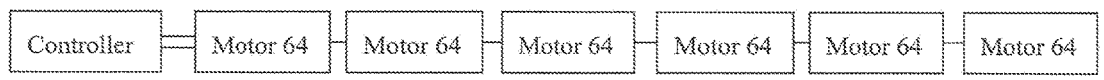
FIG. 8 is a block diagram showing a control circuit and motors of the drive apparatus of FIG. 6.

FIG. 6 and FIG. 7 are perspective views of the drive apparatus according to a second embodiment. FIG. 8 is a block diagram showing a control circuit of motors of a drive apparatus according to the second embodiment. Referring to FIG. 6 to FIG. 8, the construction of the drive apparatus of the present embodiment is similar to the drive apparatus of the previous embodiment, except that the drive apparatus of the present embodiment further includes a circuit board 70. The circuit board 70 is preferably located between the two support brackets 61 and can be fixed to either of the support brackets 61. The circuit board 70 defines a central through hole 72 through which the motors 64 extend. The motors 64 may be connected in series, and one of the motors is connected to a controller (one of the lines between the controller and the motor represents a power supply line, and the other line represents a control line). The controller may supply power to the motors and control operation of the motors. In this embodiment, the motors 64 are all direct current brushless motors. The motors 64 are all connected in series or in parallel and therefore need only one controller.

In the drive apparatus for the electric bike as described above, multiple small motors simultaneously drive the idle gears which in turn drive the internal gears to thereby rotate the housing body. This makes the entire operation system safer and more stable, and achieves higher power density while controlling the size of the entire drive apparatus.

In addition, peaks of the cogging torque of the motors can be staggered by configuring each of the motors, which can avoid the situation that the cogging torque of all or most motors peaks at the same time. Therefore, this can reduce the cogging torque of the entire drive apparatus and hence reduce the zero-load resistance of the electric bike. In comparison with traditional transverse flux motors which generally have a cogging torque greater than 1.5 Nm, the cogging torque of the drive apparatus of the present invention can be reduced to less than 1 Nm.

In particular, the initial relative positions between the motor stator and rotor can be adjusted with respect to each motor such that the initial relative position of each motor is different. This can be done simply by selecting the appropriate locations of the holes for fixing the motors to the support brackets. For example, by rotating the motor stators, the initial positions of the stators relative to the rotors of the various motors can differ in sequence by a certain angle. For example, in the present embodiment, all motors are four-pole and six-slot (i.e. having four permanent magnetic poles and six winding slots) permanent magnetic direct current brushless motors and have the same stator and rotor constructions with the same parameters. When the motors are mounted, by rotating the motor stators, the initial positions of the stators relative to the rotors of the various motors can differ in sequence by a 5-degree mechanical angle (i.e. the difference between the initial position of the stator relative to the rotor of the second motor and the initial position of the stator relative to the rotor of the first motor is 5 degrees, the difference between the initial position of the stator relative to the rotor of the third motor and the initial position of the stator relative to the rotor of the first motor is 10 degrees, the difference between the initial position of the stator relative to the rotor of the fourth motor and the initial position of the stator relative to the rotor of the first motor is 15 degrees, the subsequent motors can be deduced by analogy). This configuration may reduce the cogging torque of the entire drive apparatus to below 0.5 Nm or even to 0.4 Nm.

It is to be understood that, for a drive apparatus formed by n motors, the initial position of the stator relative to the rotor of each motor may be shifted in sequence by a 360/m/n-degree mechanical angle, where m is the least common multiple of the number of the magnetic poles and the number of the winding slots of the motor. It is also to be understood that the initial relative positions between the motor stators and rotors may differ in sequence by a certain angle by rotating the motor rotors.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

For example, while the drive apparatus is described as having two ring gears, or one ring gear per motor unit, it is possible for there to be one common ring gear as shown in FIG. 2. In this arrangement the ring gear may form an integral part of the housing body.

The invention claimed is:

1. Drive apparatus for an electric bike, comprising: a hollow housing body; a main shaft passing through the housing body; at least one internal ring gear fixed with the housing body; and at least two motor units are mounted in the housing body, wherein each motor unit comprises a support bracket fixed to the main shaft, and multiple motors mounted on a first side of the support bracket, each of the motors drives the ring gear through a transmission mechanism, which in turn rotates the housing body about the main shaft.

2. The drive apparatus of claim 1, wherein the support bracket comprises multiple mounting portions, each mounting portion defines a shaft hole, the transmission mechanism comprises an idle gear and a drive gear, a motor shaft of each motor passes from the first side of the corresponding support bracket through the corresponding shaft hole and is connected to the drive gear on an opposite second side of the support bracket, the idle gear is disposed on the second side of the support bracket, the drive gear is meshed with the idle gear, and the idle gear is meshed with the ring gear.

3. The drive apparatus of claim 2, wherein the at least two motor units comprise two motor units, each of the support brackets comprises three said mounting portions uniformly distributed, the two support brackets are spaced apart in an axial direction and the mounting portions of the two support brackets are alternately arranged in a circumferential direction, such that each motor of one support bracket is arranged between two corresponding adjacent motors of the other support bracket.

4. The drive apparatus of claim 3, wherein the at least one ring gear comprises two ring gears and each ring gear is fixed in an annular groove formed in an inner surface of a circumferential wall of the housing body.

5. The drive apparatus of claim 3, wherein each mounting portion defines a mounting hole and a support pin is fixedly mounted in the mounting holes so as to extend away from the support bracket on the second side thereof and the idle gear is rotatably mounted to the support pin in mesh with the ring gear and the drive gear.

6. The drive apparatus of claim 1, wherein each motor comprises a stator and a rotor, and at least part of the motors have a different initial position between the stator and rotor.

7. The drive apparatus of claim 6, wherein the initial position of the stator relative to the rotor of each motor is shifted in sequence by a 360/m/n-degree mechanical angle, where m is the least common multiple of the number of magnetic poles and the number of winding slots of the motor, and n is the number of motors.

8. The drive apparatus of claim 6, wherein a cogging torque of the drive apparatus is less than 1 Nm.

9. The drive apparatus of claim 1, wherein the motors of at least two motor units are connected in series and share one controller.

10. The drive apparatus of claim 9, wherein the drive apparatus further comprises a circuit board, the controller is disposed on the circuit board, and the circuit board is fixed to the support bracket of one of the motor units.

11. The drive apparatus of claim 1, wherein outer flanges at opposite ends of the housing body are formed with multiple protrusions, and end caps are fixed to the protrusions with fasteners.

12. The drive apparatus of claim 1, wherein opposite ends of the housing body are enclosed by respective end caps, and a bearing is mounted in each of the end caps for rotatably connecting the housing body to the main shaft.

13. An electric bike, incorporating the drive apparatus of claim 1.

* * * * *